J. A. Morelock,
Washing Machine.
No. 105,969. Patented Aug. 2, 1870.
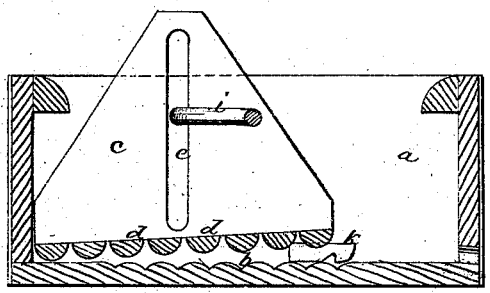
Fig. 1.
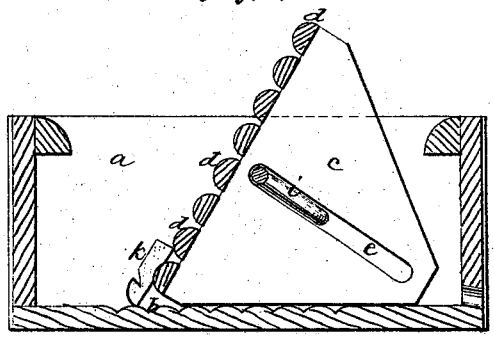
Fig. 3.
Fig. 2.
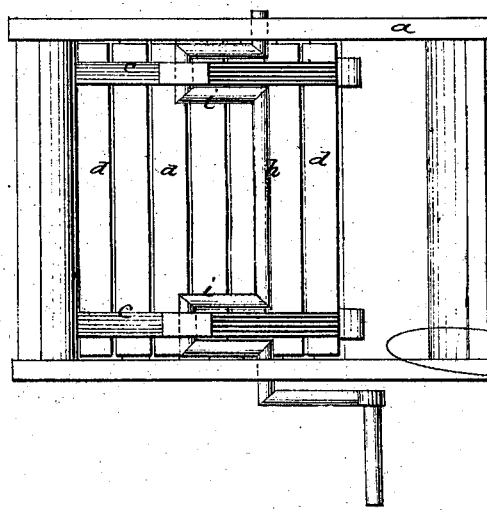
Witnesses:
Inventor:

United States Patent Office.

JEREMIAH A. MORELOCK, OF SILVER RUN, MARYLAND.

Letters Patent No. 105,969, dated August 2, 1870.

IMPROVED WASHING-MACHINE.

The Schedule referred to in these Letters Patent and making part of the same.

*To all whom it may concern:*

Be it known that I, JEREMIAH A. MORELOCK, of Silver Run, in the county of Carroll and State of Maryland, have invented a new and improved Washing-Machine; and I do hereby declare that the following is a full, clear, and exact description of the same, reference being had to the accompanying drawing forming a part of this specification, in which—

Figure 1 is a sectional elevation;
Figure 2, a plan view; and
Figure 3, an elevation of the rubber, turned up so as to form a hand wash-board.

This invention consists in a box with a corrugated or furrowed bottom, combined with a rubber having a vertical slot in each of its side plates, and a crank-shaft whose offsets pass through said slots, and which is supported in the sides of the box, the rotation of the shaft causing the rubber to slide back and forth, owing to the pressure of the offsets alternately against each side of the slots, the rubber being provided with feet for turning over the clothes.

The invention also consists in a rubber, so constructed and arranged that it may be turned up in an inclined position, so as to form a good hand wash-board serviceable in case of breakage of the crank-shaft.

In the drawing—
$a$ is the box;
$b$, the corrugated bottom;
$c$, the rubber, consisting of two vertical plates, connected by slats $d$ at their lower ends;
$e\ e$, the vertical slots;
$h$, the crank-shaft; and
$i\ i$, the offsets passing through the slots.

Shoes $k$ are attached beneath the rubber, at one side, for the purpose of more thoroughly agitating the clothes.

The vertical side plates $c\ c$ are inclined at each side. The rubber may be turned up so as to rest on one side of the plates, and, when so turned, its bottom $b$ forms an inclined board, which may be used for hand-washing when the machine becomes broken.

Having thus described my invention,
What I claim as new, and desire to secure by Letters Patent, is—

The washing-machine, formed by the combination, with the box $a$, provided with the corrugated bottom $b$, of the rubber $c$, provided with the vertical slots $e$ in its triangular sides $c$, and the bottom slats $d$ and crank-shaft $h\ i$, all constructed and arranged to operate as shown and described.

JEREMIAH A. MORELOCK.

Witnesses:
UPTON ROOP,
HENRY S. ECK.